United States Patent
Kabany (10) Patent No.: US 11,794,695 B2
(45) Date of Patent: *Oct. 24, 2023

(54) CAR SHARING MANAGEMENT SYSTEM

(71) Applicant: B-Horizon GmbH, Regensburg (DE)

(72) Inventor: Mohammad Kabany, Regensburg (DE)

(*) Notice: Subject to any disclaimer, the term of this patent is extended or adjusted under 35 U.S.C. 154(b) by 425 days.

This patent is subject to a terminal disclaimer.

(21) Appl. No.: 16/795,955

(22) Filed: Feb. 20, 2020

(65) Prior Publication Data

US 2021/0261096 A1 Aug. 26, 2021

(51) Int. Cl.
*B60R 25/30* (2013.01)
*G06Q 50/30* (2012.01)
(Continued)

(52) U.S. Cl.
CPC .......... *B60R 25/305* (2013.01); *B60R 25/022* (2013.01); *B60R 25/25* (2013.01);
(Continued)

(58) Field of Classification Search
CPC ..... B60R 25/305; B60R 25/022; B60R 25/25; B60R 16/037; G01L 1/142; G01N 27/223;
(Continued)

(56) References Cited

U.S. PATENT DOCUMENTS 7,181,409 B1 * 2/2007 Murakami ............ B60L 53/665 705/5
7,213,462 B2 * 5/2007 Watanabe ............ G01N 27/223 73/714

(Continued)

FOREIGN PATENT DOCUMENTS

CN 107719306 A 2/2018
DE 10 2013 002 281 A1 8/2014
(Continued)

OTHER PUBLICATIONS

Office Action, for German Application No. 10 2019 108 159.9, dated Jul. 10, 2019.
(Continued)

*Primary Examiner* — Joseph H Feild
*Assistant Examiner* — Rufus C Point
(74) *Attorney, Agent, or Firm* — Michael J. Gallagher; Luper Neidenthal & Logan (57) ABSTRACT

A sharing management system for managing usage objects, particularly vehicles. A detection apparatus installed on the object identifies a user from a database, At least one optical and/or physical sensor detects the user and obtains optical data, and a processing unit is configured and provided to store measured values of the sensor. Data measured by the sensor are sent from the processing unit to a CPU. The CPU and/or the processing unit compares these data with corresponding values stored in or sent to the database, and, if the sensed values or corresponding value ranges match stored values, the CPU sends a release signal to a comparing device, which then releases the usage object for use, in particular wherein the CPU is installed in at least one assembly station, in particular a stationary assembly station, away from the usage object, so that the CPU can communicate wirelessly with the comparing device.

13 Claims, 5 Drawing Sheets

(51) Int. Cl.
*G06Q 50/04* (2012.01)
*B60R 25/022* (2013.01)
*B60R 25/25* (2013.01)
*G01N 27/22* (2006.01)
*H04W 4/40* (2018.01)
*G01L 1/14* (2006.01)
*G06V 40/16* (2022.01)
*H04L 67/12* (2022.01)

(52) U.S. Cl.
CPC ............ *G01L 1/142* (2013.01); *G01N 27/223* (2013.01); *G06Q 50/04* (2013.01); *G06Q 50/30* (2013.01); *G06V 40/161* (2022.01); *H04W 4/40* (2018.02); G06Q 2240/00 (2013.01); *H04L 67/12* (2013.01)

(58) Field of Classification Search
CPC .... G06Q 50/04; G06Q 50/30; G06Q 2240/00; G06V 40/161; G06V 20/597; G06V 40/172; H04W 4/40; H04W 4/38; H04L 67/12; Y02P 90/30
See application file for complete search history.

(56) References Cited

U.S. PATENT DOCUMENTS

| | | | | |
|---|---|---|---|---|
| 8,111,942 | B2* | 2/2012 | Farrer | G06V 40/16 382/209 |
| 8,180,112 | B2* | 5/2012 | Kurtz | G06V 40/50 382/116 |
| 9,305,155 | B1* | 4/2016 | Vo | G06F 3/04817 |
| 10,591,576 | B1* | 3/2020 | Tang | G01S 5/16 |
| 2006/0259353 | A1* | 11/2006 | Gutmann | G06Q 10/02 705/13 |
| 2011/0213629 | A1* | 9/2011 | Clark | G06Q 30/0641 705/5 |
| 2012/0127308 | A1* | 5/2012 | Eldershaw | G08G 1/147 340/932.2 |
| 2013/0238167 | A1* | 9/2013 | Stanfield | G08G 1/095 701/2 |
| 2014/0129053 | A1* | 5/2014 | Kleve | B60R 25/24 701/2 |
| 2014/0129301 | A1 | 5/2014 | Van Wiemeersch et al. | |
| 2015/0082920 | A1* | 3/2015 | Haick | G01L 19/0092 73/865.8 |
| 2015/0191152 | A1 | 7/2015 | Gennermann | |
| 2017/0313271 | A1 | 11/2017 | Pena Casimiro et al. | |
| 2018/0247037 | A1* | 8/2018 | Weller | G06F 21/32 |
| 2019/0051069 | A1 | 2/2019 | Cooley | |
| 2019/0054899 | A1 | 2/2019 | Hoyos et al. | |
| 2020/0025702 | A1* | 1/2020 | Kabany | G01N 27/223 |
| 2020/0088589 | A1* | 3/2020 | Kabany | G01N 33/0075 |

FOREIGN PATENT DOCUMENTS

| | | |
|---|---|---|
| DE | 10 2014 204 762 A1 | 9/2015 |
| DE | 10 2019 009 128.0 | 11/2020 |
| DE | 10 2019 108 159.9 | 8/2022 |
| EA | 3 398 820 A1 | 7/2018 |
| EP | 3 398 820 A1 | 7/2018 |
| WO | 2010045554 A1 | 4/2010 |

OTHER PUBLICATIONS

European International Search Report, for Application PCT/EP2020/051768, filed Jan. 24, 2020.
European Search Report dated Nov. 30, 2020.

* cited by examiner

CAR SHARING MANAGEMENT SYSTEM

The present invention relates to a car sharing management system for managing usage objects, in particular vehicles, comprising the preamble of claim 1.

The car sharing management system according to the invention comprises at least one detection apparatus installed on the usage object for identifying the user stored in a database, comprising at least one optical and/or physical sensor which detects the user by means of sensors and/or obtains optical data, and at least one processing unit which is configured and provided to store measured values of the sensor, wherein the processing unit sends the data measured by the sensor to a CPU (central processing unit), wherein these data are processed by the processing unit.

The detection apparatus installed on the usage object preferably recognises a chip card or the like of the user or a PIN entered by the user in a corresponding app or a control terminal attached to the usage object. If the signal from the chip card or the entered PIN matches the values stored in the database, the user can open and use the usage object, in particular the vehicle.

According to the invention, the CPU and/or the processing unit compares these data with values stored in a database or corresponding values sent to the database and, preferably only if these values or corresponding value ranges match, the CPU sends a release signal to a comparing device, which then releases a usage object for use. According to the invention, the CPU is installed away from the usage object in at least one assembly station, in particular a stationary assembly station, so that the CPU can communicate wirelessly with the comparing device.

In other words, the present invention involves, inter alia, the fact that only authorised and/or suitable users can use the usage object. The usage object can be a vehicle seat or a vehicle steering wheel or another object to be unlocked. The usage object is particularly preferably a vehicle.

In particular, the system proposed here can therefore be a system for increasing safety, particularly in the automotive sector.

The database can be stored on the comparing device. In a preferred embodiment, the comparing device is installed on the usage object and thus moves with the usage object.

The data communication between the CPU and/or the processing unit and the comparing device can be carried out wirelessly, for example via WLAN, Bluetooth or the like.

The CPU and the processing unit are preferably arranged differently from one another and in particular at a distance from one another.

In a preferred embodiment, the sensor is an infrared, ultrasound or UV sensor and/or an optical image camera and/or a VCSEL. A VCSEL is a laser diode, in which the light is emitted perpendicular to the plane of the semiconductor chip, in contrast to the edge-emitting laser diode, in which the light is emitted on one or two flanks of the chip.

In a further preferred embodiment, the sensor is a sensor for measuring pressure and/or humidity, wherein the sensor comprises at least one capacitor having at least two electrodes, which are arranged relative to each other, in particular in a horizontal direction, along and on a support material, in particular a flexible support material, wherein at least one dielectric layer is arranged between the electrodes, wherein at least one electrode is arranged on a side facing away from the support material and/or an at least partially liquid-permeable and/or liquid-absorbing moisture layer is/are arranged on the dielectric layer, at least in some places, wherein the at least one electrode and/or dielectric layer is/are thus arranged in a transverse direction between the support material and the moisture layer such that a capacitance is at least partially changed by the liquid at least partially incident on the dielectric layer, wherein the processing unit is configured and provided for storing the measured values of the sensor, such that a capacitive humidity sensor is produced, wherein the processing unit sends the data measured by the sensor to the CPU, wherein these data are processed by the processing unit.

Also when using a sensor for measuring pressure and/or moisture, the CPU and the processing unit are preferably different from each other. For example, the CPU and the processing unit are spaced apart from each other. In particular, the processing unit and the CPU cannot be arranged on a common support and/or substrate in this case unless the support is the support material, i.e. for example, a textile.

The horizontal direction is preferably a main extension direction of the flexible support material.

In this context, 'flexible' means that the support material is bendable and thus resilient at least in some places.

In particular, the support material may be a woven fabric or another clothing fabric such as, for example, a polyester.

The dielectric layer thus spaces the two electrodes in a horizontal and/or in a transverse direction perpendicular thereto.

A capacitive humidity sensor is in principle a capacitor of which the dielectric preferably consists of a hygroscopic polymer layer which takes up (absorbs) or releases (desorbs) moisture according to the humidity of the ambient air until an equilibrium state (diffusion gradient=0) is reached. The dielectric constant of the polymer material changes as a function of moisture content.

The object of the processing unit is, inter alia, to determine the relative humidity as accurately as possible from a measured ambient temperature and the moisture-dependent capacitance value of the sensor.

The humidity sensor is particularly preferably arranged in a vehicle seat of a usage object, such as in particular a vehicle.

It is also conceivable for the apparatus claimed here, and in particular the sensors, to be installed on an inner surface of a tyre. It is also conceivable for the sensors to even be incorporated into the material of the tyre. In this case, it is conceivable for all the sensors to be incorporated into the material and thus be encased by the material of the tyre and for the processing units to be arranged on the inner surface of the tyre. Alternatively, however, the processing units can also be incorporated into the material of the tyre. The sensors can then detect the internal tyre pressure, the internal tyre temperature and/or the individual or total running time of the tyre.

According to at least one embodiment, the measurement system comprises at least one apparatus for measuring pressure and/or humidity, wherein the apparatus has at least one sensor for measuring pressure and/or humidity, wherein the sensor comprises at least one capacitor having at least two electrodes, which are arranged relative to each other, in particular in a horizontal direction, along and on a support material, in particular a flexible support material, wherein at least one dielectric layer is arranged between the electrodes.

According to the invention, at least one electrode and/or dielectric layer, at least in some places, and at least one, at least partially liquid-permeable and/or liquid-absorbing layer (=moisture layer) is/are arranged on a side facing away from the support material, wherein the at least one electrode and/or dielectric layer is/are thus arranged in a transverse direction between the support material and the moisture layer such that a capacitance is at least partially changed by the liquid at least partially incident on the dielectric layer, wherein a processing unit is configured and provided to measure and/or store these measured values of the sensor such that a capacitive humidity sensor is created.

According to the invention, the processing unit sends the data measured by the sensor to a central processing unit (CPU), wherein these data are processed by the processing unit.

In particular, a humidity limit value and/or pressure limit value, for example exactly one humidity limit value and/or pressure limit value, can be stored in the database, up to which value the usage object is activated.

In accordance with at least one embodiment, the car sharing management system comprises at least one transmitter which sends predetermined values or value ranges of the pressure and/or humidity values and/or optically obtained values to the comparing device, and the comparing device compares these received values with the values or value ranges sent from the CPU to the comparing device.

According to at least one embodiment, the transmitter is a vehicle access system, for example a vehicle key, or it is at least part thereof, the transmitter being configured and provided to communicate by means of a wireless connection with the comparing device and/or the CPU.

For example, key recognition can be implemented in this way. In particular, a key can be assigned to one or more users, preferably exactly one user. Each transmitter, in particular each key, can correspond to a very specific pressure and/or humidity value and/or physical and/or optical value, which is stored in the database. If the pressure and/or humidity value measured by the apparatus (if a user sits on a vehicle seat, for example) does not fall within a standard usage range (range of pressure and/or humidity value within which use is permitted), the use of the vehicle seat but in particular of the entire vehicle can be denied. For example, the ignition of the vehicle is not activated or the steering wheel is locked. The same also preferably applies if a signal, for example, of a chip card of the user does not match the values of the user stored in the database, or if the user enters an incorrect PIN in an app or a control terminal on the usage object. Here, for example, the vehicle cannot be opened at all.

If optical data are detected, facial recognition is carried out with an image camera, for example, or a fingerprint of the user is checked via a fingerprint sensor. Also in this case, if these data do not match the data of the user stored in the database, the user is prevented from using the object, for example by non-opening of the vehicle, use of a steering wheel lock or the like.

It is also conceivable that pressure and/or humidity values and/or physical and/or optical values generated by a user are measured by the apparatus and then fed into the key. For this purpose, the key can have a memory chip.

If the key is now used again, the shape and seating position of the seat can automatically adapt to the user based on the stored pressure and/or humidity values, for example before the vehicle seat is occupied.

With the aid of the measured pressure and/or humidity values, the system proposed here can also increase comfort in the automotive sector in addition to increasing safety.

It is also conceivable that, after the vehicle seat is occupied, depending on the identified person, a pre-stored seating position, a pre-stored light and/or sound ambience, a pre-stored music and/or radio station or other personalised services are selected and/or used. These settings can also be configured automatically on the basis of facial recognition or recognition of the chip card of the user or the like.

According to at least one embodiment, the comparing device is integrated in the vehicle key. The vehicle key can be integrated in a mobile device (mobile phone), hardware and/or software.

Alternatively or additionally, the comparing device can also be installed in the CPU and/or the processing unit. It is also possible for the CPU and/or the processing unit to take on the role of the comparing device. In this case, a separate comparing device can be dispensed with.

According to at least one embodiment, the comparing device releases a vehicle lock, an immobiliser, a steering wheel lock, an accelerator pedal and/or brake pedal for use in the event of a data match. These elements can in each case be a usage element.

According to at least one embodiment, on the basis of the individual values, the CPU determines at least one respective characteristic value from which it can be derived which individual is currently occupying the apparatus for measuring pressure and/or humidity according to weight and/or size and/or other physical properties, and/or that after the vehicle seat is occupied, depending on the identified person, a pre-stored seating position, a pre-stored light and/or sound ambience, a pre-stored music and/or radio station or other personalised services are selected and/or used.

According to at least one embodiment, if the measured data do not match the stored data and/or differ by more than 25% from the stored data values, a face detection device detects the face of the user on the basis of image data which, as already mentioned above, correspond to the optically obtained data or have been obtained therefrom and, despite the data discrepancy, the user element is then activated if the face detection device identifies a user face as identical to a face stored in the face detection device.

According to at least one embodiment, the detected image data are compared with the authorisation data, which are also stored in the database, this comparison comprising a classification comparison of data classes of the image data with data classes of the authorisation data, wherein a classification of the image data is carried out on the basis of movement vectors of the user in such a way that a movement profile is first created by the face detection device from the temporal movement of the user, the movement profile of the user comprising movement vectors of said user, and further wherein a user and/or user movements are combined into so-called data blops or data clusters, which are then classified in terms of their shape and/or extent.

The sensor and/or the processing unit and/or the CPU can be supplied with electrical energy by means of a battery or a fixed mains power supply.

Alternatively or additionally, the generation of electrical energy for supplying the sensor and/or processing unit by means of so-called "energy harvesting" is possible.

Energy harvesting refers to the recovery of small quantities of electrical energy from sources such as ambient temperature, vibrations or air flows for mobile apparatuses with low power. The structures used for this purpose are also called nanogenerators. In wireless technologies, energy harvesting avoids limitations by wired power supply or batteries.

Possibilities of energy harvesting:
Piezoelectric crystals generate electrical voltages when force is exerted, for example by pressure or vibration. These crystals can be arranged at or on the support material.

Thermoelectric generators and pyroelectric crystals gain electrical energy from temperature differences. These generators can be arranged at or on the support material.

The energy of radio waves, a form of electromagnetic radiation, can be captured and used energetically via antennas. An example of this is the passive RFIDs. These antennas may be arranged at or on the support material.

Photovoltaics, electrical energy from the ambient light.

Osmosis.

An energy accumulator of the apparatus can be part of a processing unit. For this purpose, one or a plurality of the processing units can have such an energy accumulator (local energy accumulators). For example, only one or some of the processing units have such an energy accumulator such that one of these processing units supplies electrical energy to another processing unit (namely one that has no energy accumulator).

It is also conceivable for the energy storage unit(s) of the processing unit(s) to supply the CPU with electrical energy wholly or in part. For example, the CPU can thus be connected to no other energy accumulators and/or power supply lines.

At least one of the energy accumulators can be charged via the energy harvesting mentioned above.

The energy transmission between the sensors and/or the processing units and/or the CPU can be wholly or in part wireless.

For example, the wireless energy transmission in the near field, also referred to as non-radiative coupling, includes inductive coupling, which is based on magnetic flux. The term 'wireless energy transmission' is frequently used synonymously for inductive energy transmission because it plays a dominant role in practical applications. Wave phenomena play no role in non-radiative coupling in the near field.

For example, the wireless energy transmission between the individual elements occurs by means of inductive coupling, resonant inductive coupling and/or capacitive coupling.

According to at least one embodiment, the control system has at least two sensors, wherein the processing unit divides the sensors into groups of at least one sensor on the basis of at least one of the following criteria:

Location of the sensor or the sensors on the support material, wherein the support material is divided into surface regions and only sensors of one group are arranged within a surface region, a surface area of a sensor.

According to at least one embodiment, the control system comprises at least two apparatuses for measuring pressure and/or humidity, and/or for measuring physical and/or optical data, wherein each processing unit forwards the data received from the sensors to the CPU. The data connection between the processing unit and the CPU can be wired (with data connections) or wireless. For this purpose, at least one processing unit can establish a Bluetooth connection to the CPU.

According to at least one embodiment, at least one apparatus comprises at least two sensors. In this respect, a sensor group can already be formed by these two sensors. The two sensors can then be controlled and/or regulated by a common processing unit.

It is conceivable for the multiplicity of processing units to form a processing network, wherein the collection, processing and/or transmission of the sensor data and/or of the processing data of each sensor and/or of each processing unit is/are controlled by at least one control device (master). The control unit can be identical to the CPU described above.

However, it is also possible for one or a plurality of the processing units to constitute the master, which controls the remaining processing units (slave) and/or the other sensors (slave).

For example, one of the processing units and/or the CPU can, after the apparatus is put into operation (for example after the apparatus is switched on), select the sensors which are put into operation for a predeterminable period of use. Alternatively, all or some of the sensors can be put into operation; however, it is then conceivable for a processing unit and/or the CPU, in particular for the purpose of saving energy, to forward only data from a predetermined number of sensors (i.e. fewer than all of the sensors) to the CPU (filtering).

This master processing unit can preferably communicate with the CPU as a single unit.

Further alternatively or additionally, it is conceivable for one or all of the processing units and/or a sensor (slave or master) to communicate directly with the CPU.

According to at least one embodiment, the processing network can be subdivided into at least two network segments (VLANs), which are only logically separated from each other, by means of at least one VLAN switch, and wherein each of the detection elements is to controllable as a function of controlling by means of a VLAN switch and/or of the control device and thus by means of each of the network segments.

If, for example, a very large area (for example a textile) is equipped with a multiplicity of sensors and processing units claimed here, individual processing units and/or sensors can then be categorised in a particularly simple manner (according to different priorities, etc.). Thus, in one embodiment, a 'virtual', i.e. VLAN subdivision is selected instead of a physical network subdivision. This ensures that it is possible to react to changes in the categorisation of the processing units and/or sensors particularly quickly and without laborious conversion work.

According to at least one embodiment, the control system comprises at least one processing network, wherein the processing network is subdivided into at least two network segments (VLAN), which are only logically separated from each other, by means of at least one VLAN switch of said processing network, and wherein each of the processing units and/or each of the sensors is/are controllable as a function of the controlling by means of the VLAN switch and by means of each of the network segments.

For this purpose, the VLAN switch can be installed in at least one of the processing units and/or sensors or in a separate component.

According to at least one embodiment, a prioritisation of the individual network segments is carried out by means of the VLAN switch, in particular with regard to the data exchange thereof.

According to at least one embodiment, each processing unit and/or each network segment is/are assigned at least one VLAN ID, wherein at least one sensor or one other processing unit can be controlled via each of the VLAN IDs. Individual sensors and/or individual processing units can form their own subnetwork.

Static project-dynamic routes are used in the prior art to communicate across network boundaries. This model of separation is clear and concise and has been used for years.

However, this has the disadvantage that broadcast requests in the subnet are visible to all subscribers and would have to be viewed from the endpoints. In other words, it has so far been possible to control different mobile terminals only via corresponding separate and physically isolated switches which are assigned to each subnet. However, such a construction is particularly expensive and large in design.

As already mentioned above, the configuration of each subnetwork with a separate switch and separate physical data lines is thus dispensed with such that a single physical structure can be used for the entire network, wherein this physical structure, i.e. network architecture, is separated only on the basis of a logical, in particular also a mathematical distinction (i.e. imaginary).

In this case, the abbreviation 'VLAN switch' refers to a network switch which is set up and intended to also operate a network in the form of a virtual local area network (VLAN).

In this respect, the network segments now claimed, which can each be designed in the form of a VLAN network, thus allow the network to be separated into a plurality of logical segments, i.e. into the network segments.

Unlike the physical separation by means of the assignment to a switch port, the devices are logically separated by a VLAN ID when disconnected by VLANs. In this case, the data stream of each station is provided with an identifier (the VLAN 'tag'). This identifier determines the affiliation of a data packet with a specific VLAN. All the devices having the same VLAN ID are now in a logical network.

In particular, a broadcast can be limited by the logical separation of the individual networks. Broadcasts are distributed only to members of the same VLAN and not to all the control elements attached to the switch.

In this respect, this also contributes not only to higher performance, but also to greater security, because the data traffic is limited to fewer addressees. In addition, users or the control elements on a VLAN usually have no way to break out of the assigned VLAN. Access to (or an attack against) another computer that does not belong to its own VLAN can therefore already be prevented by the network switch. If cross-VLAN communication is necessary, routes can be explicitly set up for this purpose.

In particular, it is pointed out that the VLAN technology described herein can be one that is adapted to and/or compatible with the IEEE 802.1Q industry standard.

The IEEE 802.1Q standard is a prioritisation and VLAN technology standardised by the IEEE that implements packet-based tagged VLANs, unlike the older, port-only VLANs. The term 'tagged' derives from the term 'material tags'.

Therefore, tagged VLANs are networks that use network packets that have a specific VLAN tag.

In particular, data fields for VLAN tagging are defined in the 802.1Q standard, which data fields can be introduced in the data area of an Ethernet packet.

In this respect, the present network can be designed in the form of an Ethernet communications system.

This has the advantage that existing, older switches can usually also forward such packets. The inserted tag usually consists of a plurality of fields, for example four fields of an overall length of 32 bits.

Two bytes are used for the protocol ID, 3 bits are used for the priority field, 1 bit is used for the indicator of the canonical format and 12 bits are used for the VLAN ID.

To uniquely identify a VLAN, each VLAN is therefore first assigned a unique number. This number is called a VLAN ID. A detection module equipped with the VLAN ID=1 can communicate with any other device on the same VLAN, but not with a device on another VLAN, such as ID=2, 3, etc.

In order to differentiate between the VLANs, an Ethernet frame is extended by 4 bytes according to the IEEE 802.1Q standard. Of these, 12 bits are provided to accommodate the VLAN ID such that, in theory, 4096−2=4094 VLANs are possible (without using the canonical format).

It is conceivable for the individual logical network connections to be designed according to an OPC standard, i.e. for example, in the form of OPC UA connections. In particular, it is conceivable for a plurality of OPC UA endpoints having different IP addresses, VLAN IDs and prioritisations according to the above IEEE 802.1Q standard to be available for each network segment via the control device.

If a network segment, which has been allocated a specific VLAN ID in an unambiguous, preferably one-to-one manner, has higher priority than a network segment of a correspondingly different VLAN ID, which differs only logically therefrom, then the control device and/or the VLAN switch can be provided to initially to prefer the data exchange of the higher-priority network segment in order to allow processing of the lower-priority network segment only after the tasks assigned to this higher-priority network segment have been cleared.

In other words, the following generally applies: Assignment and configuration of the OPC UA endpoints to a specific network segment according to the VLAN ID and assignment of a priority according to the priority of the corresponding VLAN.

According to at least one embodiment, at least one VLAN ID is assigned to each sensor and/or processing unit and at least one, for example exactly one VLAN ID is assigned to each network segment in an unambiguous, preferably one-to-one manner, wherein at least one control element can be controlled via each of the VLAN IDs. According to at least one embodiment, at least one apparatus comprises at least one temperature sensor, wherein the temperature sensor measures an ambient temperature and/or a temperature of a sensor and forwards it to the processing unit of an apparatus and/or to the CPU.

According to at least one embodiment, the CPU determines a degree of utilisation (CPU load and/or memory consumption) of at least one processing unit, wherein the power of the sensor(s) is at least in part throttled or switched off completely if a limit temperature of the processing unit and/or at least of the sensor assigned to said processing unit is exceeded.

In addition, according to at least one embodiment, the sensor is a capacitive pressure sensor, wherein the processing unit is additionally configured and provided for measuring and/or storing a capacitance change of the capacitor caused by external pressure.

In principle, a capacitive sensor is therefore a sensor which operates on the basis of the change in the electrical capacitance of a single capacitor or of a capacitor system. The influencing of the capacitance by the value to be detected can be done in various ways, which are primarily determined by the intended use.

Among other things, a capacitive sensor is based on two electrodes, one of which can be the surface to be measured, forming the "plates" of an electrical capacitor of which the capacitance or capacitance change is measured, which can be influenced as follows:

A plate is displaced and/or deformed by the effect to be measured, thereby changing the plate spacing and thus the electrical measurable capacitance.

The plates are rigid and the capacitance itself changes by bringing an electrically conductive material or a dielectric into immediate proximity.

The effective plate area changes by sliding the plates against each other as in a rotary capacitor.

In order to be able to better detect even small changes, the actual measuring electrode can often be surrounded by a shielding electrode which shields the inhomogeneous edge region of the electric field from the measuring electrode, thereby resulting in an approximately parallel electric field between the measuring electrodes of the usually earthed counterelectrode and the known characteristic of an ideal plate capacitor.

A capacitive pressure sensor is in particular one in which the capacitance change due to the flexing of a membrane and the resulting change in the plate spacing is evaluated as a sensor effect. For example, the membrane is the above-mentioned dielectric or else the individual capacitor electrodes, which may be designed in particular in the form of a plate. In other words, in such an embodiment a capacitive humidity sensor is combined with a capacitive pressure sensor in a novel way, but without these components forming separate elements or two separate sensors, but in the present embodiment it is a "two in one" concept in which the same sensor functions both as a humidity sensor and also as a pressure sensor.

In accordance with at least one embodiment, the support material is a woven fabric, in particular into which electrical conductor paths for electrical contacting of the sensor and the processing unit are woven.

In the context of the invention, a woven fabric is therefore a fabric which has been woven manually or mechanically on the basis of individual threads.

The electrical conductor paths can therefore additionally be integrated in a fabric in addition to the usual fibres and fabric strands or replace individual fabric strands which form the fabric mesh.

Depending on the spacing and properties of the individual threads (twisted, bulked, etc.), quite loose fabrics such as bandage fabrics, or dense fabrics such as brocade material can be produced. For lengthwise resilience, fabrics are used in which rubber threads (more tapes used) or crinkled and bulked yarns are used as warp threads. They are stretched, processed and contract in the resting state. Bulked yarns consist of textured, i.e. crinkled synthetic fibres. The crinkling changes the properties of the synthetic fibres. The spun yarns are very resilient and voluminous and have a good thermal insulation.

For example, the support material may be part of an upholstery material of a seat, in particular a vehicle seat or an office chair. In this respect, the sensor, but preferably the entire apparatus, can be applied to the upholstery material of such a seat or can be integrated into such a material.

For example, the processing unit is configured and provided for detecting the individual humidity and pressure values and for determining from a combination of the individual humidity and pressure values at least one respective characteristic value from which it can be deduced which individual (with weight and/or size) just occupied the vehicle seat. For example, from the pressure measurement by the processing unit, a weight or a pressure/force distribution of the respective person can be deduced and determined. Also, the respective moisture which the respective person delivers to the sensor can be measured, wherein the respective characteristic value is, for example, a product of the relative humidity value times the load weight determined by the processing unit.

If such a characteristic value exceeds a corresponding limit value, the processing unit can issue a warning, in particular by means of a connection to the electronics of the vehicle. This warning may mean that the seat is overloaded or the driver is sweating too much. However, this warning can also be replaced by an appropriate indication as to which type of occupancy is using the seat. An occupancy type can be a weight classification and/or weight distribution of a respective user, or else it can be a question of whether the user is an animal, a person or even an object. Preferably, therefore, the processing unit can be integrated into a display electronics of the vehicle but at least connectable thereto.

For this purpose, it is conceivable that the processing unit connects to a receiving unit of the vehicle, for example by means of Bluetooth or another wireless connection, and the respective identification or limit value and/or the respective warning and/or the respective identification of the user are reproduced on a display of the vehicle. However, the user can also be identified by means of facial recognition, a fingerprint, a signal from a chip card or a PIN or the like.

Alternatively or additionally, it is conceivable that these individual values and/or identifications can also be retrieved externally and/or displayed externally. For example, the car may be monitored for overloading by an external controller.

For example, by means of a data link, the processing unit may be in communication with an activation unit of an airbag so that the processing unit can also control and/or regulate the activation unit, in particular with regard to an activation time of the airbag. Additionally and/or alternatively, it is possible for the processing unit to supply a controller unit of the airbag with data, for example, regarding the occupancy type, position and/or weight of a user of the vehicle seat.

These data may result in the activation time and activation sequence of the airbag being adapted to the user, thereby avoiding personal injury to the user.

According to at least one embodiment, at least one electrode and/or dielectric layer is arranged on the support material or on one the support material, in particular printed on the water-impermeable layer or is applied by means of a thin-film method.

This means that at least one element, preferably both the electrode and the dielectric layer, is/are printed on the support material or on a layer applied between the sensor and the support material, preferably an electrically non-conductive, more preferably water-impermeable layer, by means of a printing process.

The printing process may be, for example, an inkjet process.

For example, the processing unit is applied to the support material in the same manner as the sensor. For this purpose, it is conceivable that the processing unit, but at least one, in particular conductive, layer of the processing unit is printed on the support material, for example. The data communication between the processing unit and the sensor can then take place via the above-mentioned conductor paths. These conductor paths can be woven at least partially, but preferably completely, into the woven fabric or even form individual fibres of the woven fabric itself.

For example, at least one electrode is made flat. That means that a thickness of the electrode is negligible compared to its surface area. Such an electrode can therefore be produced in particular by means of a printing process.

Alternatively, a thickness of at least one electrode may be at most 5 mm. For this purpose, the printing method can be applied several times, so that at least two, but preferably more, individual printing layers are stacked on top of each other.

Furthermore, the electrode can also be arranged on the support material by means of a 3D printing method.

1. FDM Method (Fused Deposition Modelling)

Alternative names: Fused filament fabrication (FFF), fused layer modelling (FLM)

The method refers to applying (extruding) a material in layers by means of a hot nozzle. The consumable material is located, in the form of a long wire (so-called filament), on a roller and is moved by the conveying unit into a print head, melted there and applied to a printing bed. The print head and/or printing bed are movable in three directions in this case. Plastics layers can thus be gradually applied to one another.

2. SLS Method (Selective Laser Sintering)

In contrast to the sintering method, in which materials in powder form are bonded to one another under the action of heat, in the SLS method this takes place selectively by means of a laser (alternatively also an electron beam or an infrared beam). Therefore, only a specific part of the powder is melted together.

For this purpose, a thin powder layer is always applied to the printing bed by the coating unit. The laser (or another energy source) is then directed precisely to individual points of the powder layer in order to form the first layer of the print data. In this case, the powder is melted or fused and is then solidified again by slight cooling. The unmelted powder remains around the sintered regions and is used as supporting material. After a layer is solidified, the printing bed is lowered by a fraction of a millimetre. The coating unit moves over the printing bed and applies the next powder layer. Subsequently, the second layer of the print data is sintered by the laser (or another energy source). This produces a three-dimensional object in layers.

3. Three-Dimensional Printing (3DP)

The 3DP method functions very similarly to selective laser sintering, but instead of a directed energy source, a print head travels over the powder. Said print head deposits tiny droplets of a binding agent onto the underlying powder layers, which are thus bonded to one another. Otherwise, this method is identical to the SLS method.

4. Stereolithography (SLA)

Instead of a plastics wire or printing material in powder form, liquid resins, known as photopolymers, are used in the stereolithography method. Said resins are hardened in layers by UV radiation and therefore produce three-dimensional objects. For this purpose, the build platform is gradually lowered in the resin tank. There are also variants (so-called polyjet methods) without an entire tank of liquid resin. For this purpose, an epoxy resin is applied in droplets out of a nozzle and is immediately cured by a UV laser.

5. Laminated Object Manufacturing (LOM)

Alternative name: Layer laminated manufacturing (LLM)

The method is based neither on chemical reactions nor on a thermal process. Here, a film or plate (e.g. paper) is cut along the contour by means of a separating tool (e.g. a knife or carbon dioxide laser) and the parts are bonded together in layers. The lowering of the build platform therefore produces a layered object made of bonded films lying one on top of the other.

One or more water-impermeable layers and/or also the moisture layer can be applied in the same manner and/or thickness as the electrode.

According to at least one embodiment, the moisture layer completely covers the capacitor.

This may mean that the moisture layer delimits and closes off the sensor to the outside, i.e. in the transverse direction, so that the sensor is arranged between the moisture layer and the support material.

According to at least one embodiment, the sensor has at least one further capacitor, which is arranged in the transverse direction below or above the capacitor and is arranged on or below a further water-impermeable layer and is spaced apart from the capacitor by this water-impermeable layer, so that a capacitor stack is formed. The further capacitor may be constructed in the same way as the capacitor and may also be arranged in the same way as the capacitor on the further water-impermeable layer.

By means of such a capacitor stack, the sensor technology can be refined in a particularly simple manner, namely insofar as it is conceivable that, in the case of two sensors forming the capacitor stack, both sensors perform the same tasks, but respective measured values which, taken together, allow a mean value to be inferred are determined by the individual sensors. For example, the (relative) humidity of the environment is measured by each of the two sensors, wherein the moisture mean value is then determined from these two measured values. The same can apply correspondingly to the pressure measurement, so that the accuracy of the entire measurement, in particular a combination of the measurements of (relative) humidity and the respective pressure can be made very accurate.

According to at least one embodiment, the water-impermeable layer and/or the further water-impermeable layer at least partially form(s) the dielectric layer itself.

This may mean that instead of the separate positioning of a dielectric layer next to the water-impermeable layer and/or next to the further water-impermeable layer, this dielectric layer itself is formed by the water-impermeable layer and/or the further water-impermeable layer.

Such a production of the dielectric layer by the water-impermeable layer(s) therefore forms a particularly simple and cost-effective production method for a cost-effective apparatus.

Apart from that, it can basically be provided that the electrodes, the dielectric layer and the water-impermeable layer(s) are arranged in such a way that an electrical short-circuit is prevented in any case.

According to at least one embodiment, a maximum thickness of the moisture layer is at least 30% and at most 80% of the maximum thickness of the water-impermeable layer and/or the maximum thickness of the further water-impermeable layer.

This not only ensures a particularly flat sensor, but also it ensures a particularly fast response time to humidity changes. The humidity acting from outside on the moisture layer therefore does not have to travel long distances to the dielectric.

In the following, the invention described here will be described in greater detail with reference to two embodiments and the associated drawings.

Like or analogous components are provided with the same reference signs.

Figure 1A:
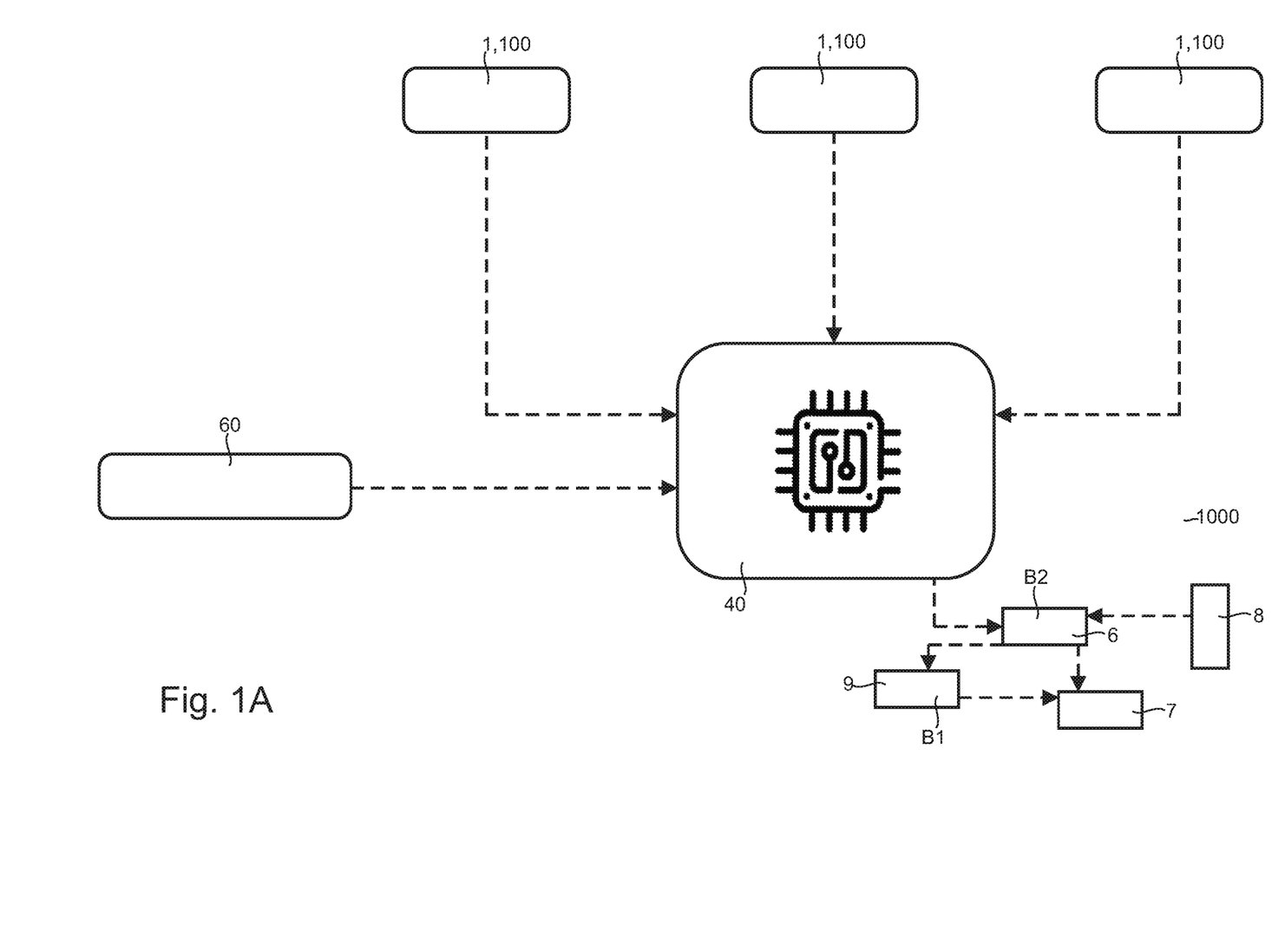
FIG. 1A to 1C show an embodiment of a car sharing management system described here and in accordance with the invention.

FIG. 1A shows a section of a schematic structure of a car sharing management system 1000 according to the invention and described here. A processing unit 5, which is in data communication with a plurality of sensors 1, can be seen. The processing unit 5, together with the sensors 1, forms a detection apparatus 100. The optical and/or physical values and/or humidity and/or pressure values measured by the individual sensors 1 are sent to a CPU 40 in order to be stored there and/or further processed. In addition, a temperature sensor 60 is shown which measures an ambient temperature and/or a temperature of the sensor 1 and forwards it to the processing unit 4 of the apparatus 100 and/or to the CPU 40.

The CPU 40 and/or the processing unit 5 compares these data, i.e. the optical and/or physical values and/or pressure and/or humidity values, with corresponding values stored in a database or sent to the database and, preferably only if these stored values or corresponding value ranges match, the CPU 40 sends a release signal to a comparing device 6, which then releases a usage object 7 for use.

A transmitter 8 is provided, which sends predetermined values or value ranges of the optical and/or physical values and/or pressure and/or humidity values to the comparing device 6, the comparing device 6 comparing these received values with the values or value ranges sent from the CPU 40 to the comparing device 6.

On the basis of the individual optical and/or physical values and/or humidity and pressure values, the CPU 40 can determine at least one respective characteristic value, from which it can be derived which individual according to weight or height is currently occupying the apparatus 100 for measuring pressure and/or humidity and/or is using the usage object 7.

A face detection device 9 is also shown, by means of which the detected image data B1 are compared with the authorisation data B2, which are also stored in the database, this comparison comprising a classification comparison of data classes of the image data B1 with data classes of the authorisation data B2, a classification of the image data B1 being carried out on the basis of movement vectors of the user in such a way that a movement profile is first created by the face detection device 9 from the temporal movement of the user, the movement profile of the user comprising movement vectors of said user, and further wherein the movement profile of the user includes movement vectors of said user, and further, wherein users and/or user movements are combined into so-called data blops or data clusters, which are then classified in their form and/or extent.

Figure 1B:
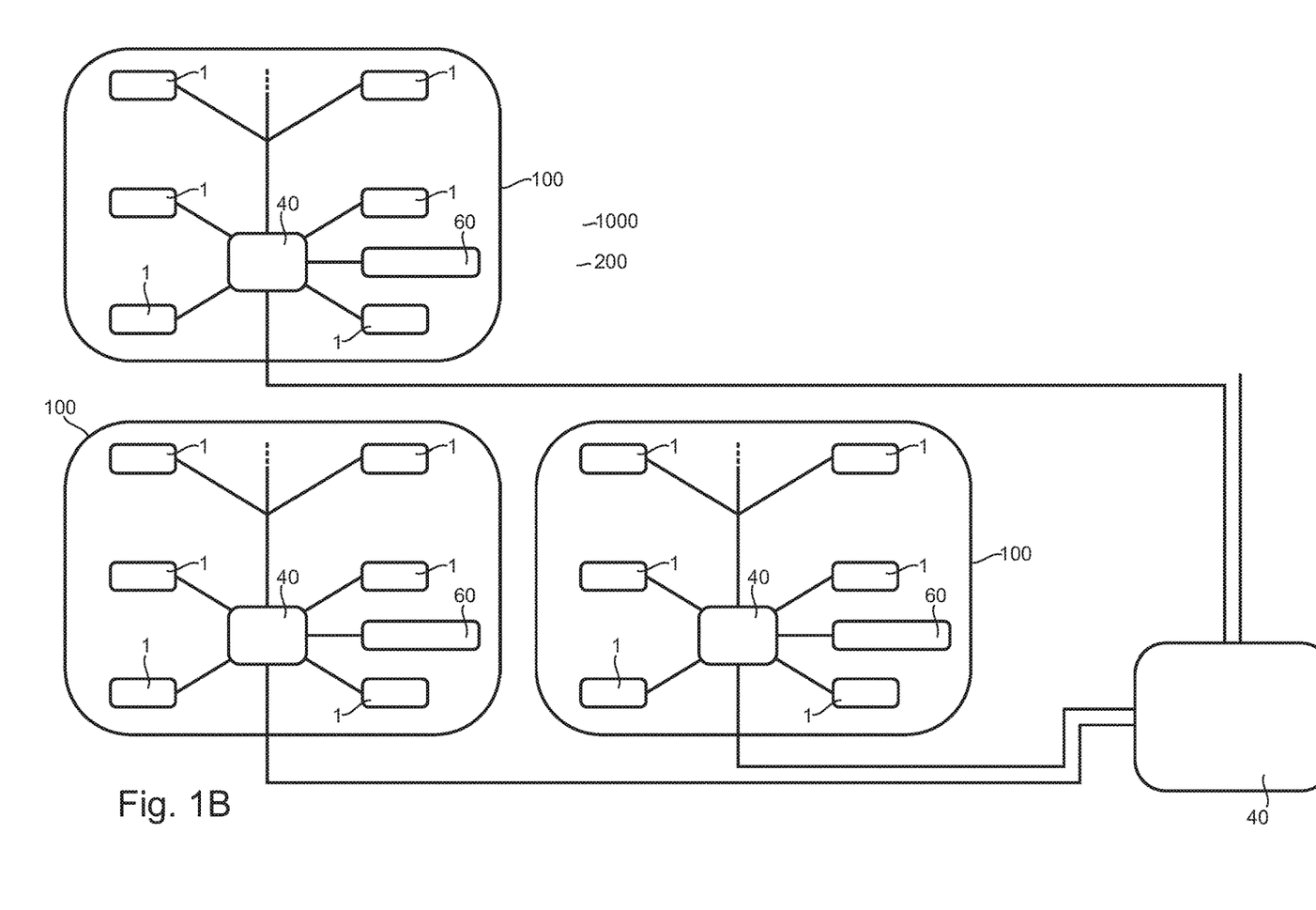

FIG. 1B schematically shows the entire car sharing management system 1000 with a plurality of sensor groups which are formed by the individual detection apparatuses 100 for measuring optical and/or physical values and/or pressure and/or humidity and which each show a processing unit 5. Each processing unit 5 is therefore associated with a plurality of sensors 1.

Figure 1C:
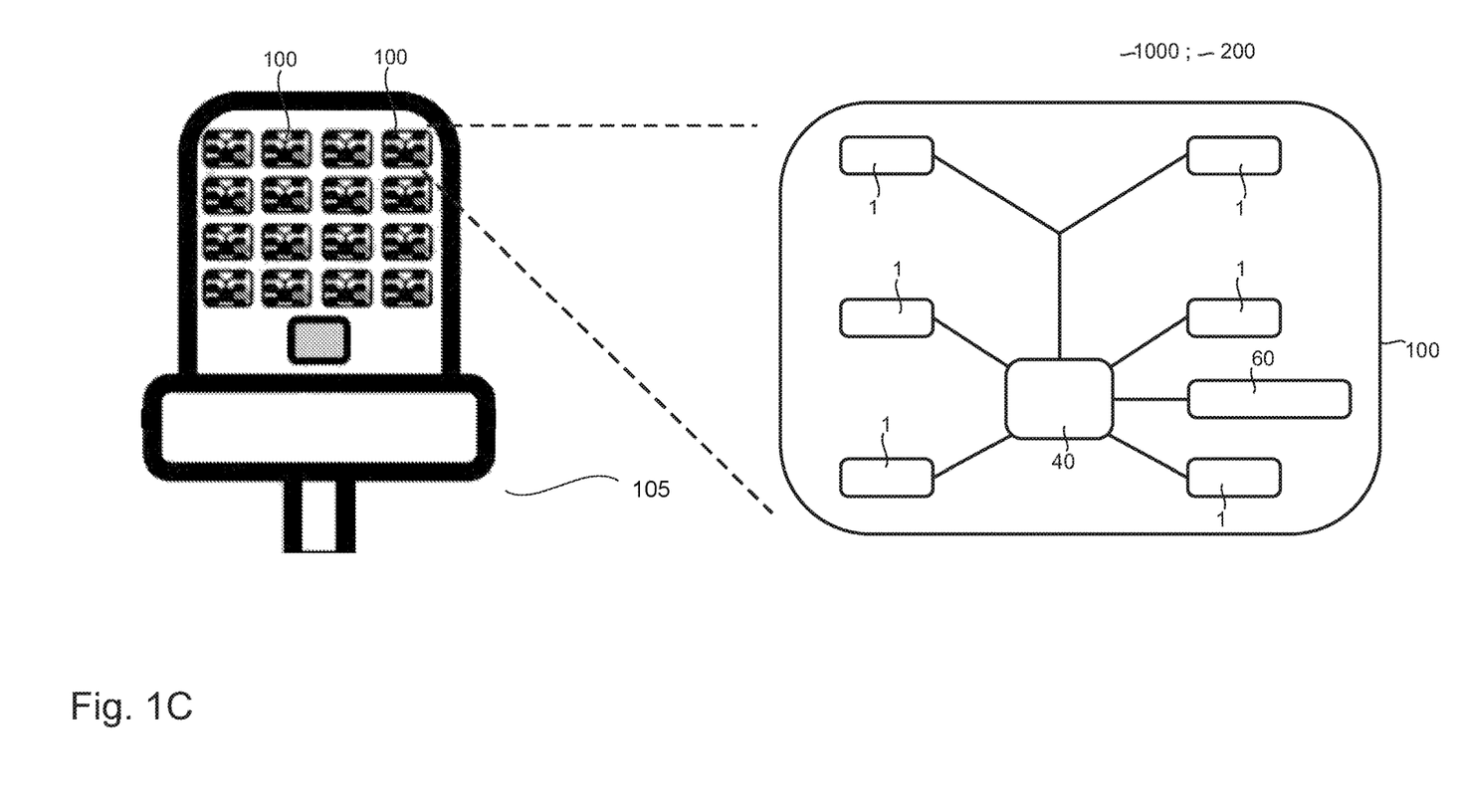

FIG. 1C schematically shows an installation and integration of the car sharing management system 1000 in a seat, in particular in a vehicle seat 105. However, the car sharing management system 1000 can also be arranged on a tyre of the usage object or in another suitable position on the usage object, depending on which values or data are to be detected by the sensor.

Figure 2:
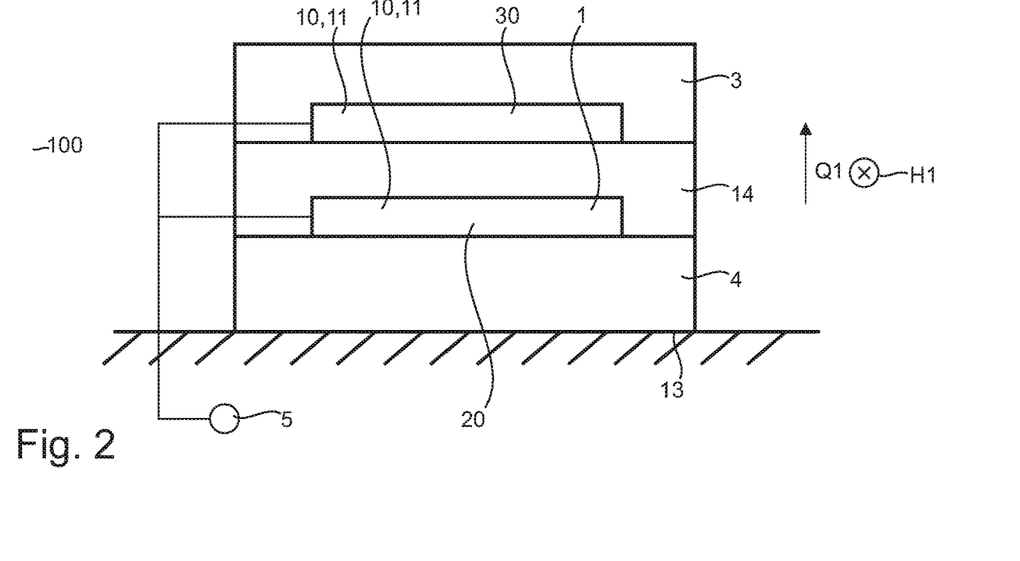
FIG. 2 is an exploded view of the layer arrangement in a schematic perspective view of a sensor of the apparatus described here.

As can now be seen in FIG. 2, a detection apparatus 100 for measuring pressure and/or humidity is shown here by way of example.

By way of example, a sensor 1 is shown here, wherein the sensor 1 shows a capacitor stack having a capacitor 20 as well as a capacitor 30, wherein the individual electrodes 10, 11 of the capacitors 20, 30 are arranged one above the other in the horizontal direction H1, wherein an arrangement of the individual electrodes 10, 11 of a single capacitor 20, 30 can of course alternatively, however, extend or be arranged in the transverse direction Q1 which is perpendicular to the horizontal direction H1 and thus also perpendicular to the main extension direction of the sensor 1 shown here.

The individual electrodes 10, 11 are arranged on a support material 13. The support material 13 can in particular be a woven fabric, in particular a flexible woven fabric.

A water-impermeable layer 4 is arranged on the support material 13, wherein the two electrodes 10, 11 of the capacitor 20 are printed on this water-impermeable layer 4 in the horizontal direction H1.

The electrodes 10, 11 of the capacitor 20 are completely surrounded by another water-impermeable layer 14. The further capacitor 30 is printed in the same manner on this water-impermeable layer 14 with corresponding electrodes 10, 11. In the present embodiment, exposed outer surfaces of the individual electrodes 10, 11 of the further capacitor 30 are also preferably completely surrounded by a water-permeable and/or water-absorbing moisture layer 3.

Water can impinge on a dielectric layer 4 via this moisture layer 3, which dielectric layer is, in the present case, arranged in the horizontal direction H1 between the respective electrodes 10, 11 of a capacitor 20, 30.

Figure 3:
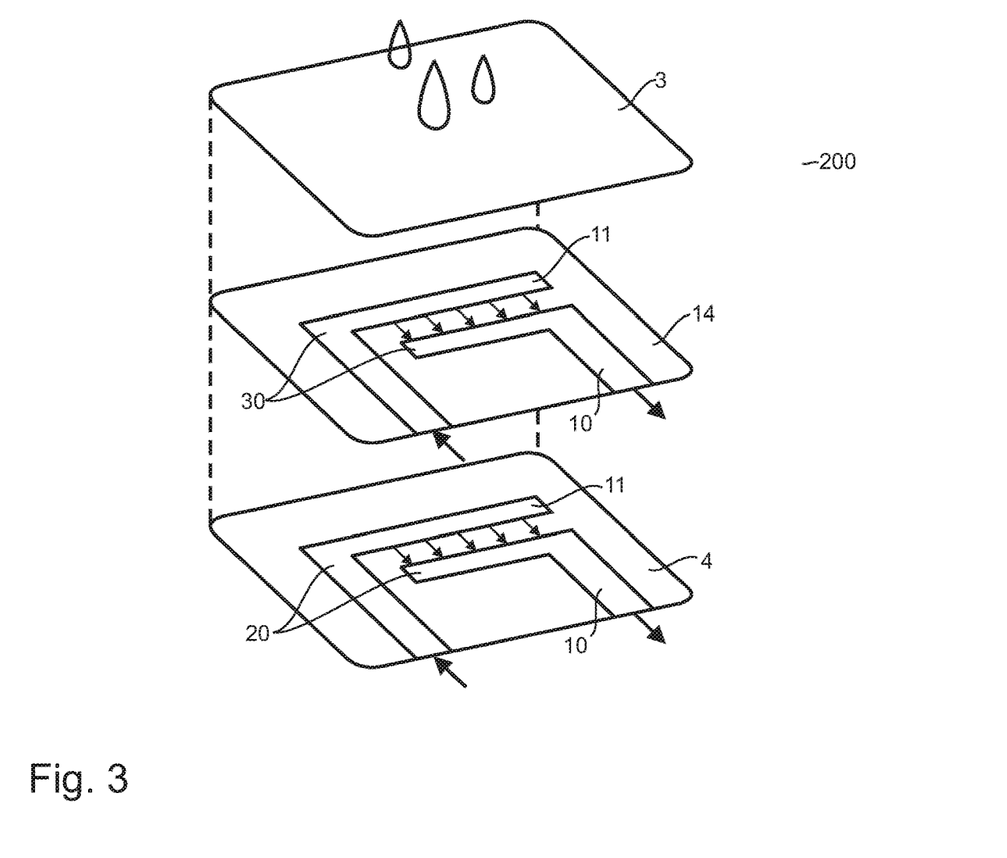
FIG. 3 shows a further embodiment of an apparatus described here.

In the present embodiment of FIGS. 2 and 3, the water-impermeable layer 4 itself forms a dielectric layer 4 of the capacitor 20. The same applies to the further water-impermeable layer 14 with respect to the further capacitor 30.

Due to the impingement and penetration of moisture via the moisture layer 3, the dielectric properties, in particular of the dielectric layer 2 of the further capacitor 30, are changed.

In addition, a processing unit 5 can be seen which is connected to the two capacitors 20, 30 by way of data technology, wherein this processing unit 5 is configured and provided to measure a change in the relative humidity of the environment and/or in the moisture layer 3.

The 'stackwise' arrangement shown in FIG. 3 and the fact that the further water-impermeable layer 14 prevents the capacitor 20 from coming into contact with moisture therefore make it possible to provide that only the further capacitor 30 and its dielectric layer 4 are exposed to moisture. For this purpose, the processing unit 5 can then compare a change in the capacitance of the further capacitor 30 with the stable capacitor capacitance of the capacitor 20 such that a particularly simple comparison of the change in the relative humidity and/or the respective loading pressure can be produced.

The arrow shown in FIG. 2 also shows the direction in which pressure is applied to the sensor 1. Both can preferably be measured, evaluated and stored by the sensor 1 and in particular by the detection apparatus 100. This purpose is served in particular by the processing unit 5 shown as being essential in the invention, which can additionally measure and evaluate corresponding pressure values and thus related changes in the capacitance of the individual sensors 1 such that the processing unit 5 is additionally configured and provided for measuring and/or storing a capacitance change of the capacitor 20 and in particular of the other capacitor 30 caused by external pressure.

The moisture layer 3 can be flexible or non-flexible. In addition, it is possible for the moisture layer 3 to be formed as a woven fabric. In particular, it can be a woven fabric which has been mentioned by way of example in the introductory part of the present application. In addition, however, it is also possible for the moisture layer 3 to be a substrate which was applied, for example glued, onto the further capacitor 30, for example in the form of an epitaxial or adhesive process.

The water-impermeable layer 14 and/or the water-impermeable layer 15 can also be designed to be flexible and non-flexible, in particular also designed in the form of a woven fabric or a substrate in the same way as the moisture layer 3.

In addition, it is advantageously conceivable for the electrodes 10, 11 of the two capacitors 20, 30 to have been printed on the water-impermeable layer 14 and on the further water-impermeable layer 15 in the form of a printing process, for example in the form of an inkjet printing process.

FIG. 3 is an exploded view, wherein the respective arrangement of the electrodes 10, 11 of the capacitors 20, 30 is shown in particular in FIG. 3. The force acting on the sensor 1 shown by the direction of the arrow, as well as moisture acting by way of the individual, schematically shown droplets can again be seen. In particular, it can again be seen that the moisture in particular penetrates between the electrodes 10, 11 and has, for example, a considerable effect on the electrical property of the respective water-permeable layer 14 such that the capacitance of at least the further capacitor 30 changes in each case as illustrated in FIG. 1.

Figure 4:
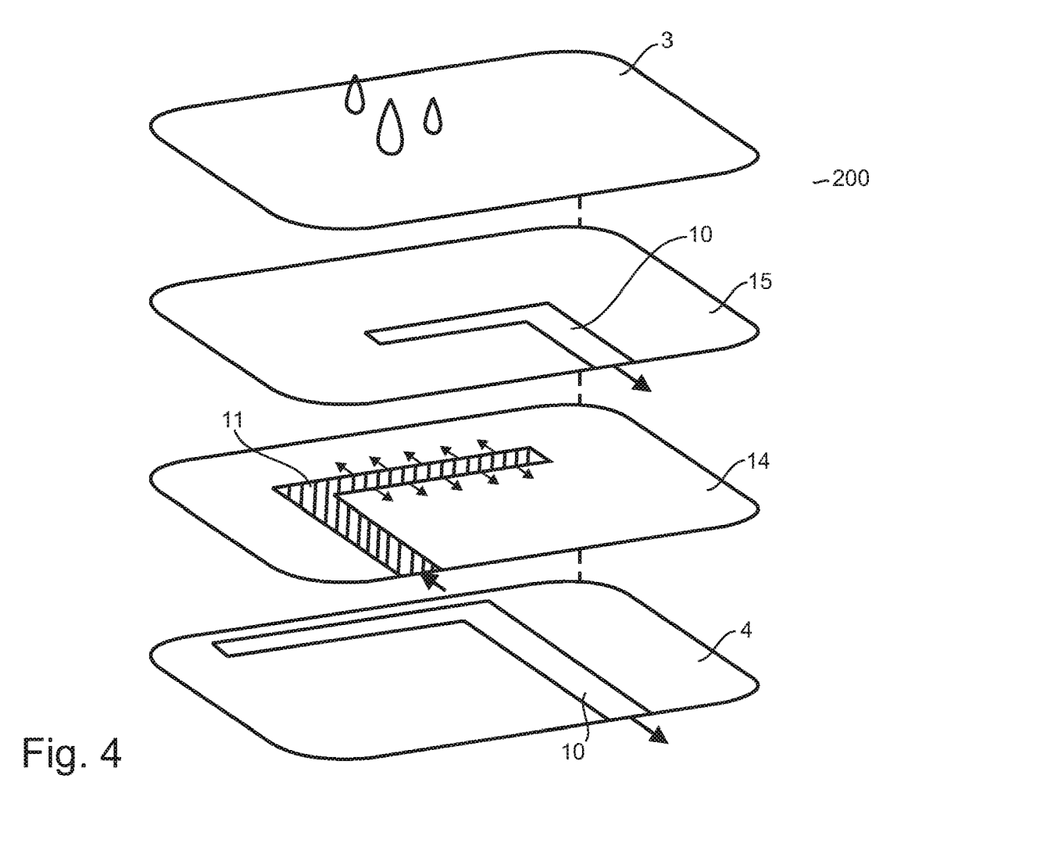
FIG. 4 shows a further embodiment of an apparatus described here.

FIG. 4 shows, in a further embodiment of the invention described here, that the sensor 1 can consist of two electrodes 10, as well as one electrode 11. The electrodes 10 have a polarity (preferably the same polarity), whereas the electrode 11 has a different polarity, wherein the lower part of FIG. 3, however, shows the exploded view of the left part of FIG. 3 and it can be seen that three water-impermeable layers 4, 14, 15 are used. The electrodes 10 can also have different polarities and/or electrical potentials. The electrodes 10 can also be electrically connected to each other.

For example, the electrodes 10, 11 can each also have and/or generate a separate polarity and/or a separate electrical potential. The same can also apply to the following drawings with respect to the electrodes.

For example, the lowermost water-impermeable layer is in turn the water-impermeable layer 4 and the subsequent water-impermeable layer 14 and the water-impermeable layer 15 arranged thereon in the transverse direction Q1 are another water-impermeable layer, wherein in each case one electrode is applied, in particular printed on a separate water-impermeable layer in each case.

In this stacking of the individual water-impermeable layers 4, 14 and 15, the capacitor 20 shown in the left part of FIG. 4 is therefore produced by merging these layers, wherein the electrodes 10 are, in each case, arranged on different planes in the transverse direction Q1, as can be seen in the corresponding partial illustration.

Alternatively, the electrode 11 can be applied in a common plane, i.e. on or in a common water-impermeable layer 4, 14, 15, together with at least one of the electrodes 10 such that, for example, only the second of the electrodes 10 must be stacked on a separate water-impermeable layer 4, 14, 15.

In principle, therefore, the individual electrodes 10, 11 can be arranged in different planes relative to one another in the Q1 direction. For example, a paired association between exactly one water-impermeable layer 4, 14, 15 and exactly one electrode 10, 11 applies.

The invention is not limited by the description with reference to the embodiment. On the contrary, the invention encompasses each novel feature, as well as any combination of features, in particular including any combination of features in the claims, even if this feature or this combination itself is not explicitly mentioned in the claims or in the embodiments.

LIST OF REFERENCE SIGNS 1 sensor
3 moisture layer
4 dielectric layer/water-impermeable layer
5 processing unit
6 comparing device
7 usage object
8 transmitter
9 face detection device
10 electrode
11 electrode
12 electrode
13 support material
14 water-impermeable layer
15 water-impermeable layer
20 capacitor
30 capacitor
40 CPU
60 temperature sensor
100 detection apparatus
105 vehicle seat
1000 car sharing management system
B1 image data
B2 authorisation data
H1 horizontal direction
Q1 transverse direction

The invention claimed is:

1. A car sharing management system (1000) for managing usage objects (7), comprising: at least one detection apparatus (100) installed on the usage object for identifying a user stored in a database, comprising
   a) at least one optical and/or physical sensor (1) which detects the user by means of sensors and/or obtains optical data; wherein the sensor (1) has at least one further capacitor (30) which is arranged in the transverse direction (Q1) above or below the capacitor (20) and is arranged spaced apart from the capacitor (20) by a further water-impermeable layer (15) on or below this further water-impermeable layer (15), so that a capacitor stack is formed, and further wherein both capacitors (20, 30) are constructed in the same way,
   and further wherein the two sensors forming the capacitor stack perform the same tasks, and further wherein the measuring system (1000) comprises at least two sensors (1), wherein by the processing unit (5) the sensors (1) are divided into groups of at least one sensor (1) based on at least one of the following criteria:
      1) location of the sensor (1) or sensors (1) on the carrier material (13), wherein the carrier material (13) is divided into surface areas, and within a surface area only sensors (1) of one group are arranged, and/or
      2) surface area of the sensor (1),
   b) and at least one processing unit (5) providing for storing measured values of the sensor (1), wherein the processing unit (5) sends the data measured by the sensor to a CPU (40), these data being processed by the processing unit (5), and wherein, c) the CPU (40) and/or the processing unit (5) compares sensed data with corresponding values stored in a database or sent to the database, and if the values or corresponding value ranges match these values, the CPU (40) sends a release signal to a comparing device (6), which then releases a usage object (7) for use, and d) wherein the CPU (40) is installed in at least one assembly station, away from the usage object (7), so that the CPU (40) can communicate wirelessly with the comparing device (6).

2. The car sharing management system (1000) according to claim 1, wherein the assembly station is a stationary assembly station.

3. The car sharing management system (1000) according to claim 1, wherein the comparing device (6) is installed on the usage object and moves with the usage object.

4. The car sharing management system (1000) according to claim 1, wherein the sensor is selected from the group of sensors consisting of an infrared, ultrasound or UV sensor and an optical image camera.

5. The car sharing management system (1000) according to claim 1, characterised in that the sensor (1) is a sensor for measuring pressure and/or humidity and wherein, the sensor (1);

a) has at least one capacitor (20) having at least two electrodes (10, 11), which are arranged relative to one another in a horizontal direction (H1) along and on a support material (13), facing one another, and at least one dielectric layer (4) is arranged between the electrodes (10, 11) wherein, b) on a side of at least one electrode (10, 11) and/or of the dielectric layer (2), facing away from the support material (13), at least one at least partially liquid-permeable and/or liquid-absorbing moisture layer (3) is arranged, and, c) the at least one electrode (10, 11) and/or the dielectric layer (4) is arranged in a transverse direction (Q1) between the support material (13) and the moisture layer (3) so that a capacitance changes at least partially due to a liquid that at least partially impinges on the dielectric layer (4), and, d) the processing unit (5) is configured and provided to measure and/or to store measured values of the sensor (1), so that, e) a capacitive humidity sensor is created, wherein the processing unit (5) sends the data measured by the sensor to the CPU (40), and these data are processed by the processing unit (5).

6. The car sharing management system (1000) according to claim 5, wherein the support material (13) is a flexible support material (13).

7. The car sharing management system (1000) according to claim 1, characterised by at least one transmitter (8) which sends predetermined values or value ranges of at least one pressure and/or humidity value or value range and/or optically obtained values to the comparing device (6), and the comparing device (6) compares these received values with the values or ranges of values sent from the CPU (40) to the comparing device (6).

8. The car sharing management system (1000) according to claim 7, characterised in that the transmitter (8) is a vehicle key or a part thereof, the transmitter (8) communicating by means of a wireless connection with the comparing device (6) and/or the CPU (40).

9. The car sharing management system (1000) according to claim 1, characterised in that the comparing device (6) is installed in the vehicle key and/or mobile phone.

10. The car sharing management system (1000) according to claim 1, characterised in that the comparing device (6) releases for use a component selected from the group of components consisting of a vehicle lock, an immobiliser, a steering wheel lock, an accelerator pedal and a brake pedal in the event of a data match.

11. The car sharing management system (1000) according to claim 1, characterised in that on the basis of the individual values, the CPU (40) determines at least one respective characteristic value from which it can be derived which individual is currently occupying the apparatus (100) for measuring pressure and/or moisture according to biological and/or optical properties such as weight and/or size, and/or that after the vehicle seat is occupied, depending on the identified person, a pre-stored seating position, a pre-stored light and/or sound ambience, a pre-stored music and/or radio station or other personalised services are selected and/or used.

12. The car sharing management system (1000) according to claim 1, characterised in that if the measured data differ by more than 25% from the stored data values, a face detection device (9) detects the face of a user on the basis of image data (B1) which correspond to the optically obtained data or have been obtained therefrom and, despite the data discrepancy, the usage element is activated if the face detection device (9) identifies a user face as identical to a face stored in the face detection device (9).

13. The car sharing management system (1000) according to claim 12, characterised in that the detected image data (B1) are compared with authorisation data (B2), which are also stored in the database, this comparison comprising a classification comparison of data classes of the image data (B1) with data classes of the authorisation data (B2), wherein a classification of the image data (BI) is carried out on the basis of movement vectors of the user in such a way that a movement profile is first created by the face detection device (9) from the temporal movement of the user, the movement profile of the user comprising movement vectors of said user, and further wherein users and/or user movements are combined into data blops or data clusters, which are then classified in terms of their shape and/or extent.

\* \* \* \* \*